United States Patent [19]
Johnson et al.

[11] Patent Number: 5,133,053
[45] Date of Patent: Jul. 21, 1992

[54] INTERPROCESS COMMUNICATION QUEUE LOCATION TRANSPARENCY

[75] Inventors: Donavon W. Johnson, Georgetown; Larry K. Loucks; Amal A. Shaheen-Gouda, both of Austin, all of Tex.

[73] Assignee: International Business Machines Corporation, Armonk, N.Y.

[21] Appl. No.: 14,888

[22] Filed: Feb. 13, 1987

[51] Int. Cl.$^5$ .................. G06F 9/00; G06F 13/00; G06F 15/16
[52] U.S. Cl. .................. 395/200; 364/242.94; 364/280.9; 364/284.3; 364/284.4; 364/286.5; 364/940.64; 364/940.5; 364/974.2; 364/DIG. 1
[58] Field of Search ... 364/200 MS File, 900 MS File; 370/85, 89, 94

[56] References Cited

U.S. PATENT DOCUMENTS

| | | | |
|---|---|---|---|
| 4,266,271 | 5/1981 | Chamoff et al. | 364/200 |
| 4,412,285 | 10/1983 | Neches et al. | 364/200 |
| 4,694,396 | 9/1987 | Weisshaar et al. | 364/200 |
| 4,706,080 | 11/1987 | Sincoskie | 370/94 |
| 4,719,622 | 1/1988 | Whipple et al. | 370/85 |
| 4,814,979 | 3/1989 | Neches | 364/200 |

OTHER PUBLICATIONS

Bach, Maurice J., "The Design of the UNIX TM Operating System", Prentice-Hall, 1986, pp. 359-367.
B. D. Fleisch, "Distributed System V IPC in Locus: A Design and Implementation Retrospective", ACM 0-89791-201-2/86/0800-0386, pp. 386-396, USA, 1986.
IBM Corporation, "IBM RT Personal Computer Technology", Form No. SA23-1057.

*Primary Examiner*—Thomas C. Lee
*Assistant Examiner*—Ayni Mohamed
*Attorney, Agent, or Firm*—Andrea P. Bryant

[57] ABSTRACT

A system for an efficient message handling technique implemented in AIX, an operating system derived from UNIX System V, is described for use in a distributed services network include a plurality of multi-processing, multi-tasking nodes among which interprocess communication occurs via queues, the actual node locations of which are transparent at the application interface.

12 Claims, 6 Drawing Sheets

ID comma INTERPROCESS COMMUNICATION QUEUE
LOCATION TRANSPARENCY

CROSS REFERENCE TO RELATED APPLICATIONS

This application relates in subject matter to the following applications filed concurrently herewith and commonly assigned:

Application Ser. No. 07/014,899, now A. Chang, G. H. Neuman, A. A. Shaheen-Gouda, and T. A. Smith U.S. Pat. No. 4,897,781 for A System And Method For Using Cached Data At A Local Node After Re-opening A File At A Remote Node In A Distributed Networking Environment. Application Ser. No. 07/014,844, filed by D. W. Johnson, L. W. Henson, A. A. Shaheen-Gouda, and T. A. Smith now U.S. Pat. No. 4,794,094 for A System and Method for Version Level Negotiation.

Application Ser. No. 07/014,897, filed by D. W. Johnson, G. H. Neuman, C. H. Sauer, A. A. Shaheen-Gouda, and T. A. Smith now U.S. Pat. No. 4,815,076 for A System And Method For Accessing Remote Files In A Distributed Networking Environment.

Application Ser. No. 07/014,900, now abandoned filed by D. W. Johnson, A. A. Shaheen-Gouda, T. A. Smith for Distributed File Access Structure Lock.

Application Ser. No. 07/014,891, now abandoned filed by L. W. Henson, A. A. Shaheen-Gouda, and T. A. Smith for Distributed File and Record Locking.

Application Ser. No. 07/014,892, now abandoned filed by D. W. Johnson, L. K. Loucks, C. H. Sauer, and T. A. Smith for Single System Image.

Application Ser. No. 07/014,889, now abandoned filed by D. W. Johnson, A. A. Shaheen-Gouda, and T. A. Smith for Directory Cache Management In a Distributed Data Processing System.

The disclosures of the foregoing co-pending applications are incorporated herein by reference.

DESCRIPTION

This invention relates to communication among processes located at different nodes in a data processing network. Each node comprises a processor, capable of standalone operation and may include other services such as terminals, memory and I/O devices. Further, each processor may have multi-processing, multi-tasking capability. More particularly, the present invention relates to facilitating queue based communication among processes located at the same or different node in the network by making it unnecessary for a program to know the node of the communication queues. Interprocess communication (IPC) queue location transparency is described as implemented in a distributed services environment.

DESCRIPTION OF THE PRIOR ART

It is disclosed in *The Design of the UNIX[1] Operating System*, by M. J. Bach (Prentice-Hall 1986) at pages 356-367, that interprocess communication (IPC) may occur by invoking the message get (MSGGET) system call with a key which invokes searching in the system resident kernel an array of message queues and; if finding no matching entry for the specified key, allocating a new queue structure and returning an identifier to the user. Algorithms associated with system calls MSGSND and MSGRCV are disclosed for sending and receiving, respectively, messages. However, there is no description or suggestion in the reference of facilitating interprocess communication among processes located at different nodes of a network.

[1]Trademark of AT&T Bell Laboratories
[2]RT and RT PC are trademarks of IBM Corporation.
[3]AIX is a trademark of IBM Corporation.

The IBM RT[2] Personal Computer is described in the book *IBM RT Personal Computer Technology* (Form No. SA23-1057). Therein the Advanced Interactive Executive (AIX[3]) Operating System structure is disclosed to be an extension of concepts in AT&T's UNIX System V.

The AIX kernel provides the operating environment for application programs and commands. For more description of AIX, refer to *AIX Operating System Technical Reference* (Form No. SV21-8009). This technology has now been extended to allow a plurality of IBM RT PC systems to be nodes in a communications network and to provide additional features.

One such feature is distributed processing throughout the network. Such a distributed services environment comprises two or more nodes connected by a communications link or network. A network may be either a local area network (LAN) or wide area network (WAN) including teleprocessing connections to other nodes or to other networks. A primary objective of distributed services is to provide local/remote transparency for applications using the AIX operating system's file system and interprocess communication (IPC) services.

SUMMARY OF THE INVENTION

The instant invention facilitates communication between processes which may be at different nodes in a network which comprises at least two systems connected over a communication link. Each node includes a processor capable of multi-processing and multi-tasking operations. As herein described, each node processor may be operated in a standalone mode, as well.

Processes located at different nodes are enabled to communicate with each other using IPC queues, the actual node locations of which are unknown to the program initiating communication. The present invention is an advance over the AIX IPC message queue capability for communication between processes in the same AIX system, by extending the AIX IPC message facilities to be capable of sending and receiving messages among queues in different nodes. AIX supports IPC using the message get (msgget), message send (msgsnd), and message receive (msgrcv) system calls. Message get is used for finding or creating a message queue and returning its identifier MSQID. Subsequent message send and message receive calls use this MSQID to identify the target queue.

The present invention proceeds from a modification to the former AIX msgget system call, to include using a key of a particular queue as an argument to a look up function in a predefined kernel resident table for correlating the user input key with the actual key and node location of that particular queue. The node location and key of the queue on which a message is to be placed are transparent to the communicating processes.

When the queue is in a remote node, the two nodes use a communication link established therebetween to pass queue element information. As described, the preferred embodiment of the invention utilizes IBM Systems Network Architecture (SNA) Level 6.2 Advanced Program to Program Communication.

IPC message queues are identified by a key, a numeric value, assigned when the queue is created. Any process desiring access to a particular queue must reference it in such a manner that the reference may be resolved to the actual queue identifier.

As will be described below, the preferred embodiment of the present inventive methodology is implemented at the operating system level where distributed services facilities are provided. The present invention requires that each system-node in a network have its own IPC queue profile name space for keys. A node unique key is returned from an application's call to a library routine which associates a node unique key with a queue name given by the caller.

The present invention also requires key mapping tables (KMT) which are resident in each system's kernel. Each entry in a key mapping table includes the local key referring to a particular queue, the node where the queue actually resides, and the key used at the node where the queue actually resides. KMTs are loaded into each node's kernel at system start-up time.

KMT data is maintained by a network administrator who oversees the network. Modifications to the KMTs are made by the network administrator as needed. This administrative operator involvement allows message queue transparency at the application interface.

In the prior art such as described in the Bach book, processes communicate by sending and receiving messages utilizing message queues. The calling process must identify the queue on which the receiving process expects to find messages. In standalone multiprocessing systems all queue locations are known. However, in a network environment with distributed services it is desirable for processes to communicate with processes which may be located at other nodes via message queues which may be at the same or different node. It would be unacceptable to require each process to implicitly know the location information for all message queues in the network. If this were required then each calling process would require changes whenever the actual message queue location has changed.

The present invention solves this problem by implementing kernel resident tables correlating queue keys at that processor node with the actual key and node location of the message queue. These tables are alterable by a network administrator to reflect changes in the actual node location of the message queue. The input parameters supplied by the calling process do not change. Therefore, the actual node location of message queues are transparent at the application program interface.

Address resolution to the actual identifier of the message queue occurs at the kernel level. KMTs receive a key as input and provide a key and node id for the desired queue. Within the kernel of each node so correlated, system call routines take the key provided by the process initiating the communication and go to the corresponding key and node. If a message queue with that identifier is not found in that node's queue header table a new one is created, if the caller requested that a queue be created, and the identifier of that message queue is returned to the calling node's kernel. At the calling node's kernel a new surrogate queue header entry is constructed comprising the actual node location and the message queue identifier. The application is then enabled to place its message on the intended message queue.

It is an object of the instant invention to provide an efficient message queue handling system with node location transparency, means for preventing assignment of conflicting queue names and means for enabling demultiplexing of messages on one queue from a given server to a plurality of clients.

These and other features and advantages will become more readily apparent from the description which follows, taken in conjunction with the accompanying drawings wherein:

DESCRIPTION OF THE PREFERRED EMBODIMENT

Figure 1:
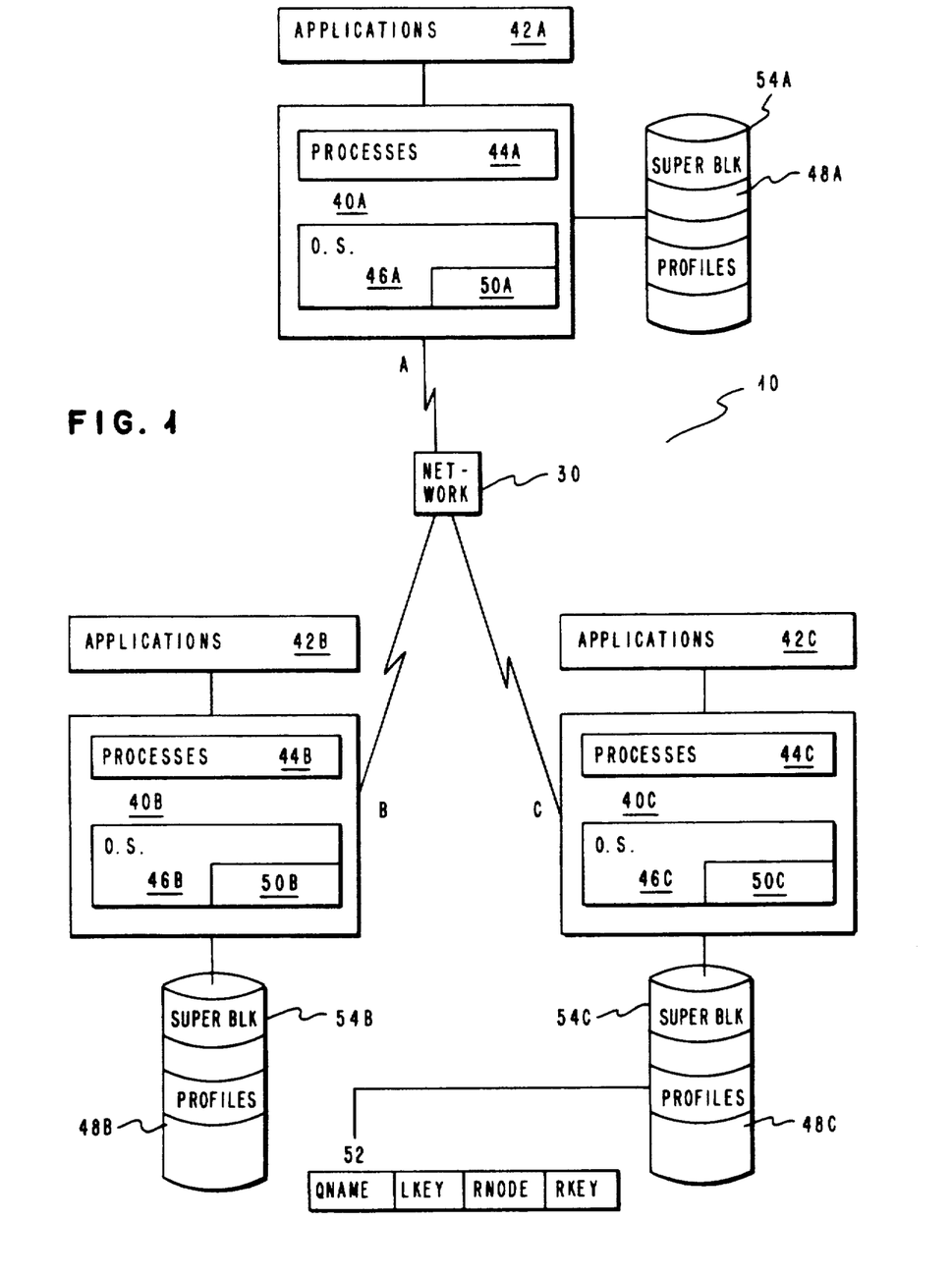
FIG. 1 is a schematic illustration of a network with a plurality of nodes in which the present invention may be embodied.

Refer now to FIG. 1 which is illustrative of a network in which the present invention is embodied. A network 10 is shown comprising a plurality of nodes A, B, and C connected over a communication link 30. Each node A, B, C includes at least one processor 40 having a multi-tasking, multi-processing capability which may operate as a standalone system or as part of the network 10.

As illustrated a communications network 30 which may be a local area or wide area network, but the preferred embodiment implements the IBM Systems Network Architecture for establishing communications links among the nodes A, B, and C. Each node includes at least one processor 40 for which user applications 42 are written. Internal to the processor 40 are processes 44 under control of an operating system 46, which in the preferred embodiment is IBM's AIX operating system. The disclosures of the various co-pending, commonly assigned applications incorporated by reference herein include descriptions of various aspects of the system in which the present invention is embodied. The instant description is limited to those aspects of network configuration 10 having particular relevance to the invention.

Each processor 40 has associated therewith a variety of storage media illustrated at 48. Not shown but contemplated by network configuration 10 are various other terminal, storage and peripheral I/O devices, connectable to each processor node in a network. Internal to the operating system 46 at each processor 40 is a kernel 50.

The description of other aspects of the invention will also reference FIG. 1.

Each autonomous node A, B, C may cooperate with another to share resources available at another node for performing a given task. In such a distributed services environment, minimal user interaction is required to take advantage of the capability provided by the instant invention of efficient message handling through message queue location transparency. Sharing resources reduces the need for replication of information at each node in the network.

Communication among processes is more efficient and less user attention to the details of communication is required because the node location of communication queues is transparent to the user program. While the actual node location of a given queue may change, a user of a given node is relieved of responsibility of tracking the location of the queues. One function of the network administrator is to maintain a current set of profiles correlating queue keys and location and to load the appropriate correlation information into the KMT in kernel 50 of each node in the network.

Included in operating system 46 for each processor node in the network configuration 10 are directory services functions which maintain information required for predefined queues. These functions include creating an IPC key, defining its location and resolving external IPC queue names to a key for a particular message queue and returning the network location and remote queue from the node from which the message will come.

Figure 2:
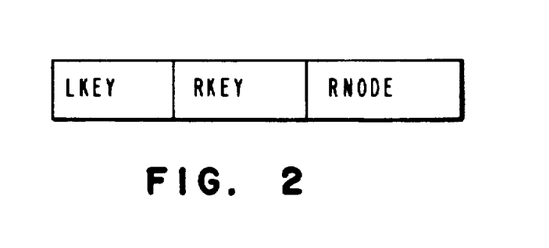
FIG. 2 shows the format of an entry in a key mapping table.

A queue profile record whose format is illustrated at 52 in FIG. 1 is, created as a result of the execution of a library routine create IPC-PROF called by an application's installation program. The program supplies a queue name which may be up to 14 characters in length and the library routine, creates the profile record and assigns a numeric LKEY value unique to that node. At system start-up time, the system reads the profiles and creates the KMT with entries as shown in FIG. 2, which includes the local key LKEY assigned by the library routine and the actual key RKEY and node RNODE for the queue designated by the LKEY.

Figure 3:
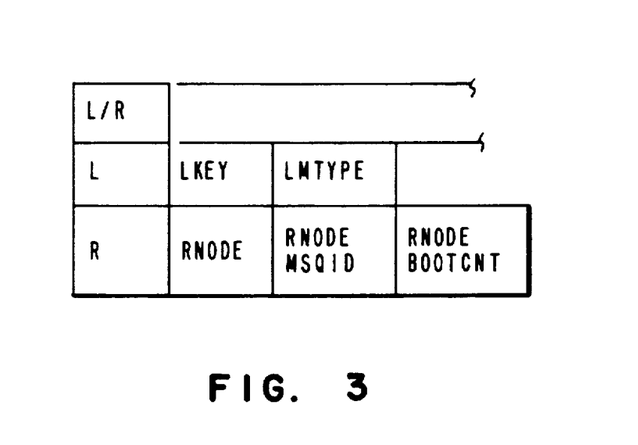
FIG. 3 shows the contents of an entry in a queue header table.

FIG. 3 shows the format of a queue header record. A server process at start-up time inputs a queue name to find_IPC_PROF and receives the key associated with that queue. The server process then issues a system call, msgget, providing that key, and msgget creates the queue.

The queue header record in FIG. 3 contains an indicator whether the particular queue is local, L, to the node at which the queue header table resides or is located at a remote, R, node. The format of the remainder of a queue header table entry is a function of the local/remote indicator. If the queue is local, LKEY contains the local queue key; and LMTYPE is the value of the message type indicator most recently used for that queue.

For remote queues, RNODE contains the node id; and RMODE MSQID, the message queue id at the remote node. The field RNODE BOOTCNT contains a number indicative of the power cycle status of the remote node.

Figure 4:
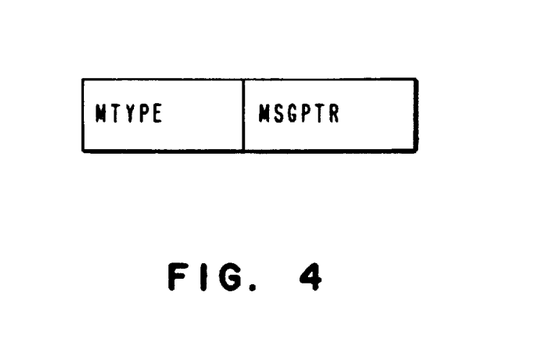
FIG. 4 shows the format of a message queue entry.

FIG. 4 illustrates the contents of a message queue entry. MTYPE contains the message type of the message; and, MSGPTR, a pointer to the message text.

Figure 5A:
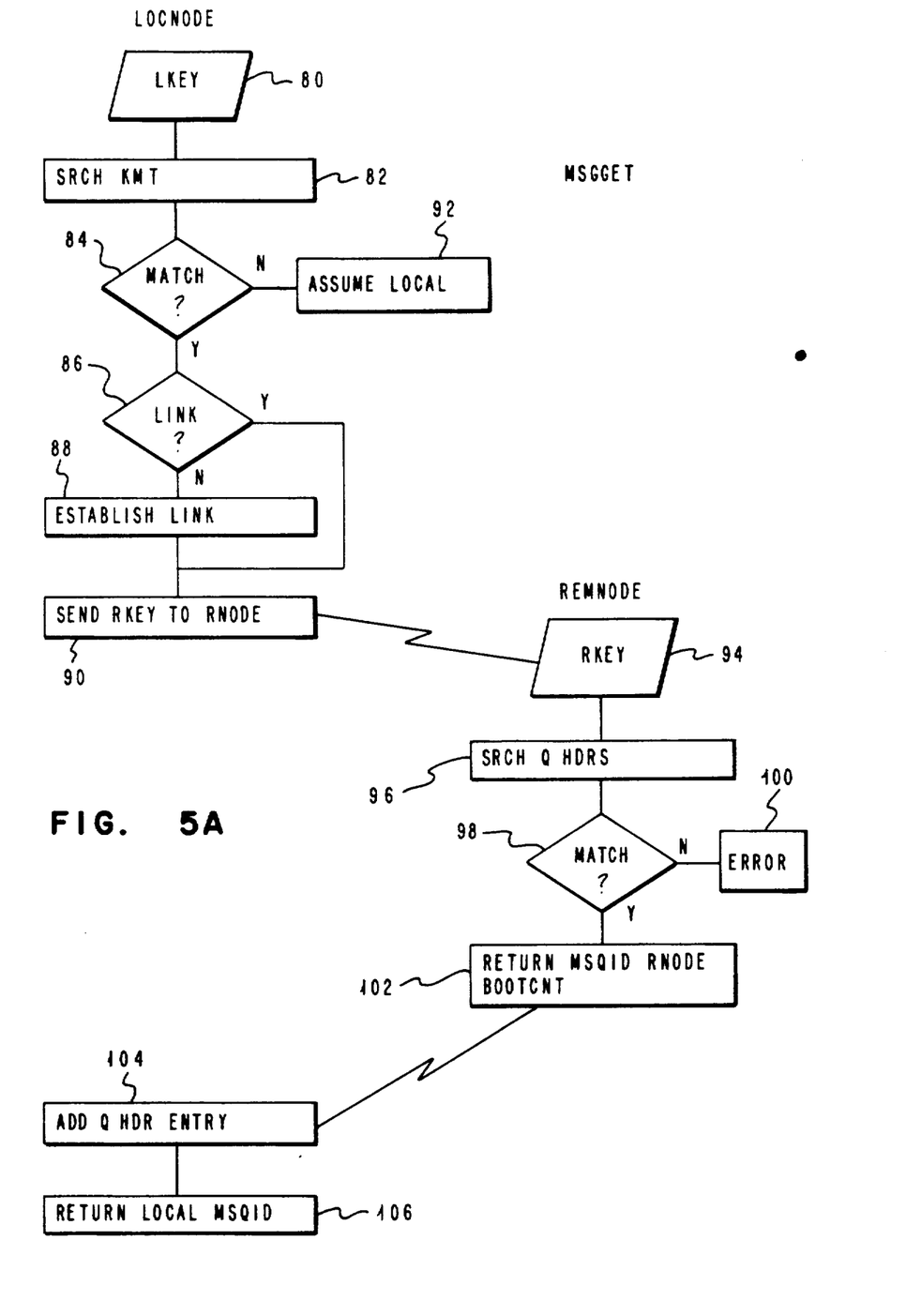
FIGS. 5A, 5B, and 5C show the logic flow during interprocess communication.

FIG. 5 is a flowchart illustrating the logic executed during IPC in accordance with the invention. When a process at node LOCNODE initiates communication, it issues a msgget system call providing a LKEY as input shown at block 80 FIG. 5A. That key is the argument to a lookup function in the kernel resident KMT of LOCNODE. The KMT is searched, block 82. If a match is found, block 84, the IPC logic determines, block 86, whether there is an existing communications link between LOCNODE and REMNODE (assuming for this discussion RNODE contains the node id for REMNODE). If there is no existing communications link, one is established, block 88, and the correlated key RKEY found in the KMT is sent to its associated node REMNODE, block 90.

If no entry was found in the KMT for the LKEY used to call msgget, the message queue is assumed to be local, block 92, and communication occurs in a conventional manner.

At block 94, REMNODE's msgget transaction program receives RKEY and then searches, block 96, the queue headers at REMNODE. If no match is found, block 98, an error condition exists and is so indicated at block 100. If REMNODE's queue headers include an entry matching RKEY, a MSQID is returned to LOCNODE, block 102, with the boot count of REMNODE, RNODE BOOTCNT.

Back at LOCNODE, as illustrated at block 104, an R format queue header entry (refer to FIG. 3) is added to the LOCNODE queue header list and the local node MSQID is returned to the caller. The calling process then executes msgsnd and the logic shown in FIG. 5B applies.

Figure 5B:
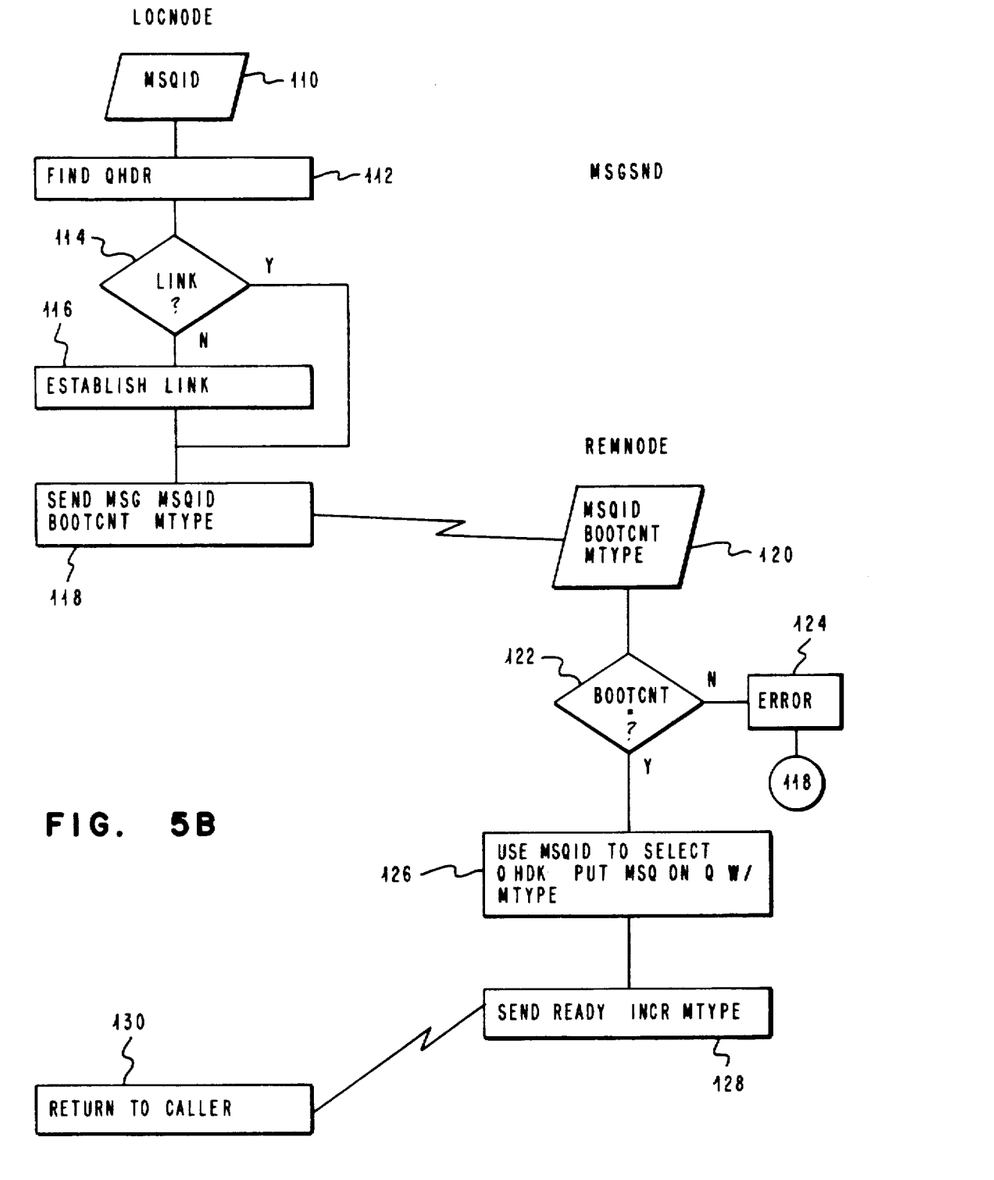

At LOCNODE MSQID, block 110, is used to index into the LOCNODE queue header list, block 112. A determination is made, at block 114, whether REMNODE (RNODE in queue header) is already connected with LOCNODE. If not, a connection is established, block 116, and LOCNODE msgsnd causes the message text, MSQID RNODE BOOTCNT, and an MTYPE to be sent, block 118, to REMNODE.

At REMNODE, its msgsnd transaction program receives MSQID, BOOTCNT, and MTYPE, at block 120. REMNODE receives this data and first compares, block 122, the received with the current boot count at REMNODE. If they do not match, an error condition exists, block 124, and is returned to LOCNODE. When the boot count values match REMNODE msgsnd transaction program uses MSQID to select a queue header and place the message text pointer, MSGPTR on its message queue along with the MTYPE, block 126. REMNODE replies, block 128, to LOCNODE which then returns to its caller, the successful completion status.

Figure 5C:
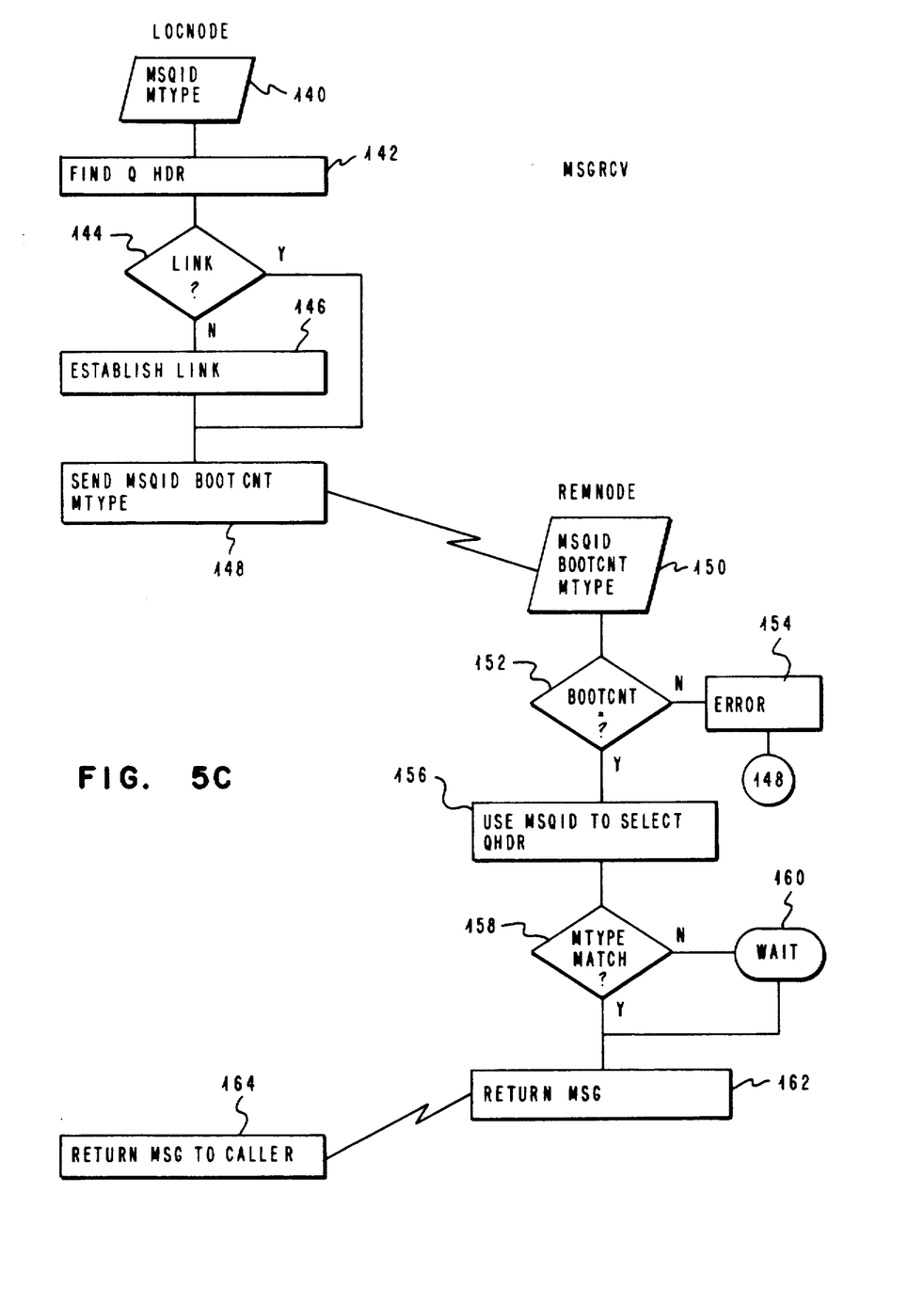

FIG. 5C illustrates the operation of the msgrcv system call. At LOCNODE, msgrcv receives a MSQID and MTYPE, block 140. It uses the MSQID to index into its queue header list and find the correct queue header. Using the RNODE information contained in the header, it determines, block 144, whether there is an existing communication connection with REMNODE and if not, establishes a connection, block 146. At block 148, MSQID, RNODE BOOTCNT, and MTYPE are sent to REMNODE over the established communication link.

After the REMNODE's msgrcv transaction program receives this information, block 150, it first compares boot count values (received and current), block 152. If the boot counts do not match, an error condition is indicated, block 154, and returned to LOCNODE.

When the boot counts match, REMNODE's msgrcv transaction program logic, block 156, uses the received MSQID to select a queue header. The logic then checks the queue's message entries to determine if there is a message with matching MTYPE, block 158. If no message on REMNODE's message queue has a matching MTYPE, then logic waits for a message to arrive, block 160. If a message with a matching MTYPE is found, the message text pointer is returned, at block 162, to LOCNODE by the same communication link already established above. LOCNODE, at block 164, returns the message text to its caller.

Figure 6:
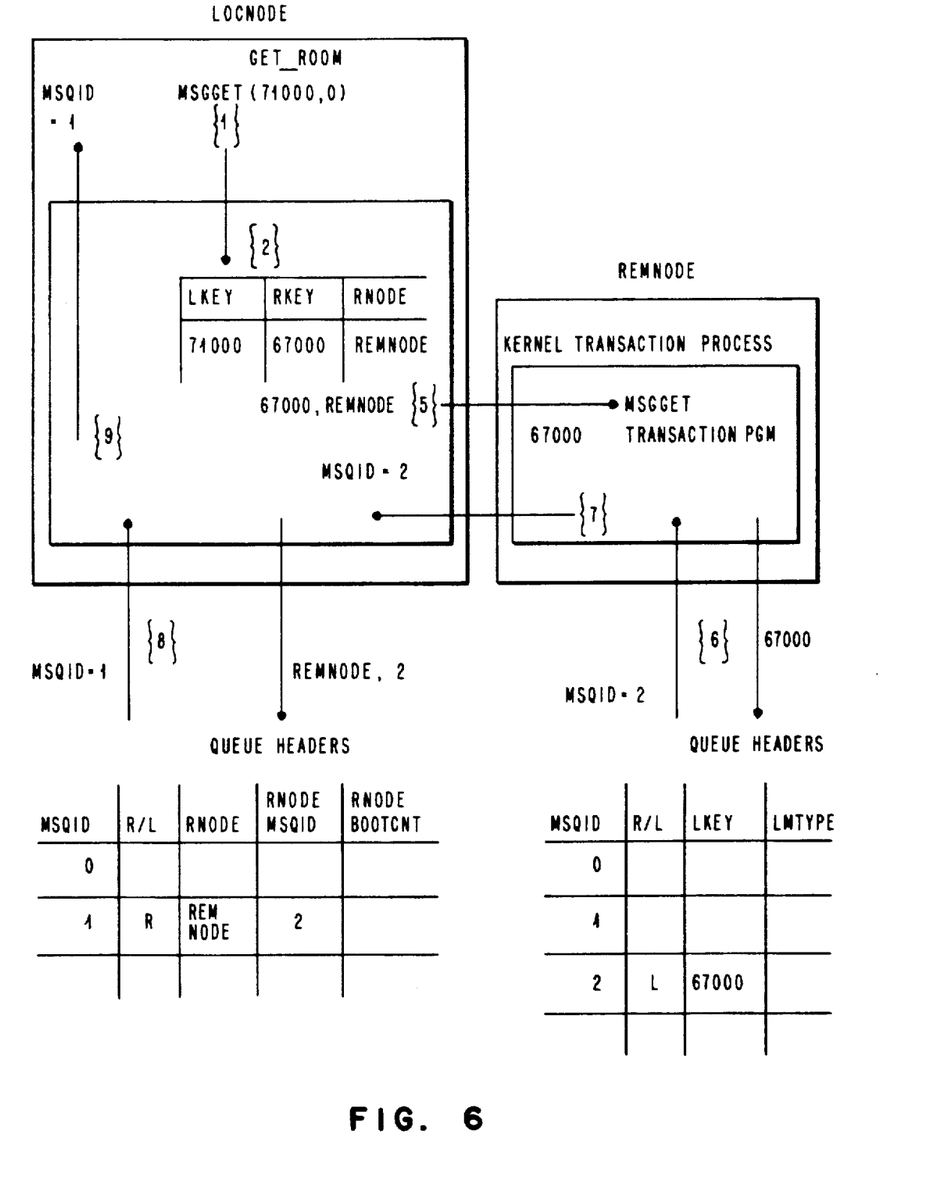
FIG. 6 shows an exemplary interprocess communication with hypothetical values.

FIG. 6 illustrates, using a particular set of hypothetical circumstances, the logic described in connection with FIGS. 5A, B, and C. Assume there is a shell command program at LOCNODE which users call to schedule conference rooms. The shell command issues a msgget for its LKEY 71000 in order to get a MSQID for the scheduler daemon IPC message queue. Assume that the network administrator has determined that conference room requests from LOCNODE should be serviced by the daemon in REMNODE and that the key for the daemon's queue in REMNODE is 67000. This information has been loaded into LOCNODE's kernel IPC KMT.

1. get_room calls MSGGET with key 71000.
2. MSGGET consults the LOCNODE KMT for key 71000.
3. The KMT indicates the key 71000 has been remapped to RKEY 67000 in RNODE REMNODE.
4. MSGGET now knows to look in REMNODE for key 67000.
5. MSGGET finds or establishes a SNA connection with REMNODE and sends a network message requesting a MSQID for key 67000.
6. The MSGGET transaction program in REMNODE locates the message queue header for the queue whose key is 67000; in this case MSQID is 2.1
7. The MSGGET transaction program in REMNODE sends a network reply to MSGGET in LOCNODE stating that the MSQID is 2.1
8. MSGGET adds an entry to its list of queue headers. The header entry contains, among other things, REMNODE in RNODE, 2 is the RNODE MSQID, and a tag R specifying that this is a local "surrogate" for a remote queue header. In this example the surrogate header for the remote queue is in slot 1 of LOCNODE's queue header list, so the LOCNODE MSQID is 1.1
9. MSGGET returns MSQID=1 to its caller.
10. get_room uses this MSQID to send IPC messages to the conference room daemon. The information in the surrogate queue header tells LOCNODE where to send the messages.

The following is a pseudo code representation of the logic flow described in connection with FIGS. 5A, B, C, and 6:

```
MSGGET
input: key
flags
output: msqid
{
run the input key through the mapping tables
if((there is no mapping for the input key)
or ( the input key maps to another key in the
local node))
{
call procedure msgget_of_local_queue
return msqid acquired by msgget_of_local_queue
}
else /* the key maps to a key at the remote node */
{
send a message to the remote node asking it to
execute its procedure msgget_of_local_queue
wait for a reply
when reply is received
allocate surrogate queue header
store returned msqid in the queue header
return local msqid for this surrogate queue
header
}
}
msgget_of_local_queue
input: key
flags
output: msqid
{
use the key to locate queue header, create one if
necessary
return a message queue id for this queue
}
MSGSND
input: msqid
pointer to message text
length of message text
flags
{
use msqid to locate a queue header
if (the header is for a surrogate queue)
{
extract the node name and remote msqid from the
surrogate queue header
send a message to the remote node asking it to
execute its procedure msgsnd_to_local_queue
wait for reply
when reply is received return to caller
}
else /* header is for a local queue */
{
call procedure msgsnd_to_local_queue
}
msgsnd_to_local_queue
input: msqid
pointer to message text
length of message text
flags
{
check to see that caller has permission to write to
the queue
while (there is not enough space to store the
message)
{
wait until there is enough space available
}
copy message text to the queue
}
MSGRCV
input: msqid
pointer to buffer to hold the message
length of the buffer to hold the message
flags
output: message, copied into message buffer
size of message
{
use msqid to locate a queue header
if (the header is for a remote queue)
{
extract node name and remote msqid from the
surrogate queue header
send a message to the remote node asking it to
execute its procedure msgrcv_from_local_queue
and return the result
wait for reply
when reply is received
copy message to caller
}
else /* header is for a local queue */
{
call procedure msgrcv_from_local_queue
}
}
msgrcv_from_local_queue
input: msqid
pointer to buffer to hold the message
length of the buffer to hold the message
flags
output: message, copied into message buffer
size of message
{
check to see that caller has permission to read
from queue
```

```
-continued
loop:
if (there is a message to receive )
{
copy message text from queue to caller
delete message from queue
}
else /* no message on queue */
{
sleep (until a message arrives on the queue)
go to loop
}
}
```

Assignment of queue keys must be managed so that duplicate keys are not created for "well known" queues, that is, queues likely to be used by many clients. A strategy is provided in accordance with the present invention which allows application project creators to create globally unique keys without the need of an external registry of assigned keys. The major element of this strategy is the use of a 14 character alphanumeric queue name in the queue profile (FIG. 1, 52) entry.

Application developers select 14 character names to uniquely represent themselves. Each queue profile entry has the following fields: QNAME, LKEY, RNODE, RKEY as shown in FIG. 1.

The library routine create_ipc_prof (QNAME, LKEY, RNODE, RKEY) creates a queue profile. The caller provides the name, and the routine creates a queue profile entry, assigns it a unique local key, and returns the local key to the caller. Subsequently, the network administrator provides data for RNODE and RKEY.

Assume a distributed application consists of a server daemon and a command program which makes requests of the server. The server resides on a particular network node; the command program can be run at any of several nodes on the network. The installation and operation of such an application are illustrated by the following example.

At the site where the daemon is to run the application's installation program calls create_ipc_prof(3) giving a queue name of "ACMEsfwr032686". The profile created by create_ipc_prof(3) contains:

| name | "ACMEsfwr032686" |
| local key | A value, chosen by create_ipc_prof(3) from the range 0x30000-0xFFFFF, that does not conflict with any other profile at this node. |
| remote node | null |
| remote key | 0 |

At each site where the command program is to run the application's installation program calls create_ipc_prof(b 3) giving a queue name of "ACMEsfwr032686". The profile created by create_ipc_prof(3) contains:

| name | "ACMEsfwr032686" |
| local key | A value, chosen by create_ipc_prof(3) from the range 0x30000-0xFFFFF, that does not conflict with any other profile at this node. |
| remote node | null |
| remote key | 0 |

The network administrator is instructed to modify the profiles at the command nodes, to contain:

| remote node | The daemon's node |
| remote key | The local key of the queue at the daemon's node |

When the daemon starts up, it calls find_ipc_prof(3) giving a queue name "ACMEsfwr032686" to find the key associated with that name. It then calls msgget(-key,0) to get an id for the queue.

A 14 character queue name gives software developers very much freedom of choice in selecting queue names. Even without cooperation among application developers, a carefully selected name chosen by one is very unlikely to collide with a name carefully selected by another. A prudent developer, however, might choose to design for the case where a collision occurs. An exemplary strategy for coping with such collisions is:

* The preferred queue name is hard coded into the application programs, but an override string may be supplied, by a command argument, on both the daemon and the command programs.
* When a daemon or command program is installed, it uses create_ipc_prof(3) to create the needed queue profile. If the create fails because of a name collision, then the network administrator is prompted for a unique queue name. The installation program then uses this queue name to create the profile.
* The installation program and/or documentation instruct the administrator to make sure that the daemon and command program are always invoked with the queue name argument.

The technique implemented to assure correct message routing will now be described. In a standalone application such as that described in the above mentioned Bach reference, the MTYPE parameter is set appropriately to make the kernel return the first message of a given type. If no messages on the queue satisfy the type, the kernel puts the process to sleep. Processes may cooperate to set up multiple channels on one message queue, whereby each process extracts messages of particular types in the order they arrive, with the kernel maintaining the proper order.

In a distributed services network environment, however, it is possible for several requestors to simultaneously deal with the same server. The present invention provides a demultiplexing function of reply messages using message type.

MTYPE values are assigned to be unique by providing in the message queue header (FIG. 3) a 32-bit MTYPE value, which corresponds to the most recently used MTYPE value. A new command for the message control (msgctl) system call causes the current value of a queue's message type to be returned. MTYPE is post incremented every time it is returned to a process (FIG. 5B, block 128).

Since it is more efficient for request and reply to flow through the same queue, the convention established for MTYPE in demultiplexing bi-directional queues further enhances network throughput.

By way of example, the following scenario illustrates a potential problem. A server powers on, in the process creating a queue, whose identifying information goes into the first queue header slot. A client does a msgget, receiving a MSQID. In the meantime the server goes through a power cycle. Some later point in time, a process at that server creates another queue, placing its identifying information in the first queue header slot. The client process then does a msgsnd using the original MSQID. The message from the client does not go to the queue the client expected.

With the technique of the present invention, this problem is avoided because a boot count comparison occurs whenever a client sends a message; and if the boot counts are not equal the client is informed of the error condition. Refer again to FIGS. 5B, blocks 122, 124 and 5C, blocks 152, 154.

Each node includes a counter, BOOTCNT, in its root device super block (FIG. 1, 54) indicative of the power on state of the server. This counter is incremented each time the server powers off and back on again. This count is used in message operations, such as those described in FIG. 5B and 5C, which use a message queue identifier to assure that the server is at the same state as it was when it issued the message queue identifier.

In summary, the present invention provides a methodology, operable at the kernel level, for interprocess communication among processors located at any node in a multi-node network. Communication is conducted through messages placed on key identified message queues which may be located at any node in the network.

At the application level, there exists no requirement for knowing the message queue node location because the key mapping tables and use thereof as described above, enable the resolution of the application supplied key into an actual message queue address for use by the message handling system calls. The integrity of message transmission is enhanced by the boot count comparison step in the requisite system calls. Multiplexing of messages for different nodes is enhanced through the provision of a more descriptive MTYPE in the queue's header entries. The queue naming convention described substantially eliminates the risk of conflicting, i.e., use of the same name by different applications, message queues in the distributed services network environment.

While the invention has been described having reference to a particular network environment and a particular communications architecture, those skilled in the art will understand that various modifications in form and detail may be made without departing from the spirit and scope of the invention.

What is claimed is:

1. A network management system for communication among processes at different nodes in a network executing user applications via key identified message queues at node locations unknown within an application requesting a communication transaction on a target queue comprising:
    an address resolution table at each node correlating a first, application supplied node unique target queue key with a second node unique key associated with said target queue; and
    routines at each node for accessing said table and constructing a target queue address for use in completing the requested communication transaction, and means for executing said routines to complete the requested communication transaction.

2. The system of claim 1 wherein each address resolution table is predefined by a network administrator.

3. A method of communicating among nodes in a network in which each node comprises a processor executing applications able to perform operations on memory resident, key identified message queues at any node in the network comprising:
    providing kernel resident predefined, modifiable tables in each column for mapping a first node unique queue key supplied by an application requesting access to a given queue identified by said first key to a second node and node unique queue key indicative of actual location of said given queue; and
    utilizing said second node unique queue key in formulating an actual address for accessing said given queue.

4. A method of facilitating communication among user applications executing at processors located at one or more nodes in a network, using message queues, actual node locations of which are transparent to the user applications, comprising the steps of:
    maintaining in memory at each node a key mapping table correlating node unique queue keys assigned to applications running at each said node with actual queue node location and keys of message queues;
    accessing a key mapping table with an application supplied key for obtaining node location and key of a message queue and establishing a communications link between an application node and the message queue node.

5. In a network supporting a plurality of processor nodes for executing user application programs, and enabling access to target queues located at any node from any node,
    system means for making target queue node location transparent to user applications comprising:
    means for providing to user applications node unique target queue keys;
    means at each node for correlating user application target queue keys with target queue location nodes and keys; and
    message handling system call routines at each node for reading said means for correlating and establishing links for communicating between said application node and said location target queue node.

6. In a distributed services network including interconnected processors, each located at a different network node, each processor including memory resident system resources and routines for creating and accessing message queues, and each processor being able to execute a plurality of user application programs, wherein communication among processors occurs via message queues located at any node in the network,
    a system for making message queue node locations transparent to user application programs comprising:
    library routine means callable from each node for assigning node unique keys to each user application program supplied queue name;
    table loading means operable at processor startup for providing at each node, a kernel resident mapping table having entries correlating said assigned node unique keys with message queue location nodes and key and
    system call routines for accepting a user application program supplied keys, locating a correlated message queue location node, and establishing a communication link between the user application program node and a correlated message queue location node for performing a message operation.

7. The methods of claims 3 or 4 additionally including the step of:
determining whether the message queue node has experienced a power cycle during a period between returning a message queue identifier to a node and the use thereof by said node.

8. The systems of claims 1, 5 or 6 additionally including:
means for determining whether a message queue location node has experienced a power cycle during a period between returning a message queue identifier to a user application node and the use thereof at said user application node.

9. A system for handling communication among processes via message queues, located a different node in a multiprocessor network comprising:
means for making node locations of message queues transparent to said processes;
means for providing non-conflicting message queue name assignment within said network; and
means for demultiplexing a plurality of reply messages on a given message queue.

10. The methods of claims 3 or 4 including the additional steps of:
associating a unique type value with each queue;
post incrementing said unique type value when an application requests a unique type value; and
using said type value to select a desired message from among a plurality of messages on a message queue.

11. The system of claim 9 wherein said demultiplexing means includes:
means for associating a unique type value with each queue;
means for post incrementing said unique type value when an application requests a user type value; and
means using said type value for selecting a desired message from among a plurality of messages on a message queue.

12. The system of claim 1 additionally comprising:
means for accepting a user application supplied alphanumeric queue name and associating therewith a node unique numeric key.

* * * * *